United States Patent [19]
Nakata

[11] Patent Number: 4,730,148
[45] Date of Patent: Mar. 8, 1988

[54] VERTICAL DEFLECTION CIRCUIT
[75] Inventor: Katsumi Nakata, Ohtsu, Japan
[73] Assignee: Mitsubishi Denki Kabushiki Kaisha, Tokyo, Japan
[21] Appl. No.: 58,613
[22] Filed: Jun. 4, 1987

Related U.S. Application Data
[63] Continuation of Ser. No. 751,449, Jul. 3, 1985.

[30] Foreign Application Priority Data
Jul. 5, 1984 [JP] Japan ................ 59-140808

[51] Int. Cl.$^4$ .................. H01J 29/70; H01J 29/76
[52] U.S. Cl. ........................ 315/397; 328/183
[58] Field of Search ............. 315/371, 396, 397; 328/183

[56] References Cited
U.S. PATENT DOCUMENTS

| | | | |
|---|---|---|---|
| 4,009,399 | 2/1977 | Hofer | 328/183 |
| 4,191,932 | 3/1980 | Nagahama | 328/183 |
| 4,404,499 | 9/1983 | Ryan | 315/371 |
| 4,477,749 | 10/1984 | Schmale | 315/397 |

FOREIGN PATENT DOCUMENTS
2050109 12/1980 United Kingdom.
2090504 7/1982 United Kingdom.

OTHER PUBLICATIONS
Examiner's Report to the Comptroller under Section 17(5), Application No. 851706.

Primary Examiner—Theodore M. Blum
Attorney, Agent, or Firm—Birch, Stewart, Kolasch & Birch

[57] ABSTRACT

A vertical deflection circuit includes a vertical deflection coil; a vertical deflection circuit for supplying an vertical deflection current to the vertical deflection coil; a current multiplying circuit multiplying a predetermined current upon the current flowing through the vertical deflection coil in an even field or an odd field of a television signal; and the raster of the even field and the raster of the odd field coinciding with each other.

10 Claims, 5 Drawing Figures

VERTICAL DEFLECTION CIRCUIT

This application is a continuation of application Ser. No. 751,449, filed on July 3, 1985.

FIELD OF THE INVENTION

The present invention relates to a vertical deflection circuit for use in a device such as a television receiver, and more particularly to that for converting the interlace system of the television scanning system into a non-interlace system so as to stabilize the characters in the character-broadcasting-receiver.

BACKGROUND OF THE INVENTION

FIG. 1 diagrammatically shows a raster of an interlace system. In this Figure the even field scanning line 1 and the odd field scanning line 2 are deviated ½·H (½ of a horizontal scanning period) in its phase, and they are inter-located with each other. For example, the even and odd fields are repeatedly displayed at each of 20 msec in a CCIR B/G PAL system, the screen vibrates at a period of 40 msec and at a frequency of 25 Hz, and the width of the vibration becomes ½·H of vertical direction distance.

Such a vibration occurring in a general television screen presents no trouble, however it is difficult to watch little characters in the character-broadcasting also caused by it being a still picture. In order to solve this problem it is planned to conduct a non-interlacing, that is, a multiplying of the even and odd field scanning lines although the picture element becomes slightly rough. As a general method to conduct such a non-interlacing, it is considered to deviate the timing of the vertical synchronicity ½·H one after another frame.

FIG. 2 shows signal waveforms of a television receiver, wherein FIG. 2(a) shows a signal waveform obtained by viewing the television signal 30 at a timing of horizontal synchronicity. FIG. 2(b) shows a signal waveform obtained by extracting the synchronizing signal 40 from the signal of FIG. 2(a). This includes the vertical and horizontal synchronizing signal. FIG. 2(c) shows a vertical synchronizing signal 20 with the horizontal synchronizing signal being removed by integrating the waveform of FIG. 2(b). This signal becomes a timing signal for the vertical deflection circuit.

In a CCIR B/G PAL system there exist 625 scanning lines in one frame of 40 msec, and the number of scanning lines in one field of 20 msec is 312.5, and two fields constitute one frame. The existence of the 0.5 scanning line among the 312.5 scanning lines necessitates interlacing.

In order to conduct a non-interlacing it is enough to determine the number of scanning lines at each field as 312, 313, 312, 313, . . . . Thus it is possible to obtain a raster of non-interlacing which has substantially no-problem. It is a minor problem that a difference arises in a raster size depending on the difference of the number of the scanning lines at each field.

The scanning period for each field becomes:

20 msec−½·H
20 msec+½·H
20 msec−½·H where, H is equal to 64 μsec.

FIG. 2(c) shows a timing of a vertical synchronizing signal for obtaining a different scanning period at each field. The waveform 20a of the left side portion of the vertical synchronizing signal 20 is shifted to the left side by ½·H as compared with the normal vertical synchronizing signal 20 at an interval of 40 msec to become a waveform 20a′ shown in dotted lines.

However, the vertical synchronizing circuit has a subtle operation, and a sufficient consideration of the wave-formation of the synchronizing signal and the circuit arrangement of the peripheral circuits is required in conducting a normal interlacing. Furthermore, it is required to conduct an exact synchronization in all conditions of television signals such as the condition where the synchronizing signal becomes long or short caused by the noise in a weak electric field or by the transmitter side's cause, and the condition where the synchronizing signal may have a default caused by the sag of the television signal.

Accordingly, it is difficult to advance the phase of the vertical synchronizing signal ½·H by this vertical synchronizing cirucit in television receivers which are produced by mass-production because it is required for the products to have the stability in their performances.

OBJECTS AND SUMMARY OF THE INVENTION

The present invention is directed to solving the problems pointed out above, and has for its object to provide a vertical deflection circuit capable of conducting a non-interlacing with an easy construction and a stable operation.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a vertical deflection circuit, which comprises: a vertical deflection coil; a vertical deflection circuit for supplying an indented vertical deflection current to the vertical deflection coil; a current multiplying circuit for multiplying a predetermined current upon the current flowing through the vertical deflection coil in an even field or an odd field of a television signal; and the raster of the even field and the raster of the odd field coinciding with each other.

DETAILED DESCRIPTION OF THE PREFERRED EMBODIMENTS

Figure 1:
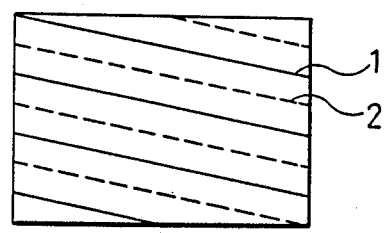
FIG. 1 is a diagram showing a raster which is obtained by conducting an interlacing.
Figure 2:
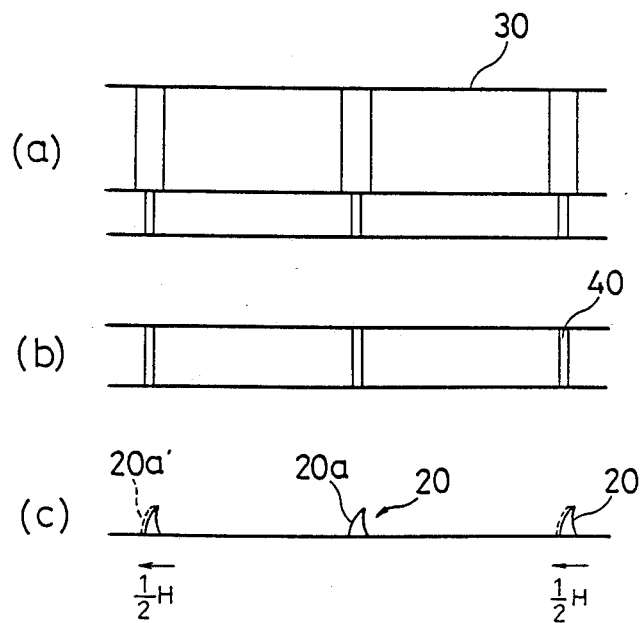
FIG. 2 is a diagram showing signal waveforms of television signals, wherein (a) shows a television signal, (b) shows a synchronizing signal, and (c) shows a vertical synchronizing signal.
Figure 3:
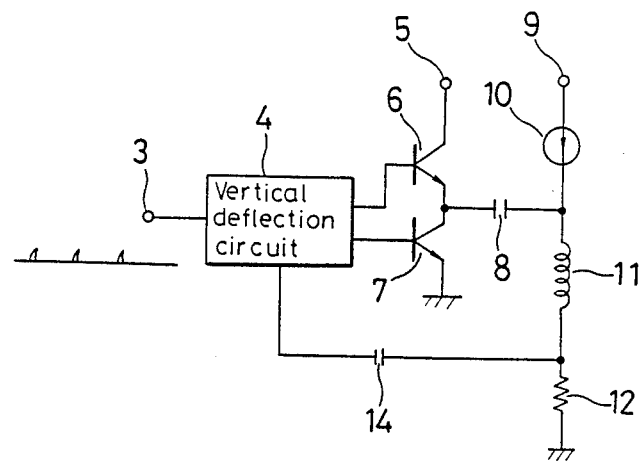
FIG. 3 is a circuit diagram showing a vertical deflection circuit as one embodiment of the present invention.

In order to explain the present invention in detail, reference will be particularly made to FIG. 3:

The reference numeral 3 designates an input terminal for a vertical synchronizing signal. The numeral 4 designates a vertical deflection circuit including a vertical oscillation circuit, a synchronization circuit, and a driver circuit. This circuit 4 is designed to drive the vertical deflection output transistors 6 and 7 to supply an indented vertical deflection current to the vertical deflection coil 11.

The transistors 6 and 7 constitute a push-pull circuit that and drives the vertical deflection coil 11 through a coupling condenser 8. The numeral 12 designates a feedback resistance intended to detect the current which flows through the vertical deflection coil 11 and to conduct a negative feedback of the AC component of the current. The numeral 10 designates a current source (a current multiplying circuit) intended to supply a constant current from the voltage source 9 to the deflection coil 11 in either an even field or an odd field. The numeral 5 designates a voltage source which is connected to the collector of the output transistor 6. The numeral 14 designates a condenser.

The device is operated as follows:

In a state where the device is conducting an interlacing, the even and the odd field scanning lines deviate from each other by ½·H. Accordingly, if the raster of the even or the odd field are deviated up or downwards upwards 1/625 of the vertical amplitude, the scanning lines of the both fields will coincide with each other. The current source (the current multipying circuit) 10 in FIG. 3 is intended to supply a constant current to the vertical deflection yoke 11 so as to deviate the raster of either the even or the odd field, and the constant current has the same constant value in alternating fields as shown by dotted lines 50 in FIG. 4(a).

Figure 4:
FIG. 4(a) is a diagram showing a current waveform for moving the raster by the circuit of FIG. 3.
FIG. 4(b) is a diagram showing a signal waveform obtained by multiplying the current for moving the raster upon the vertical deflection current.
Figure 4:
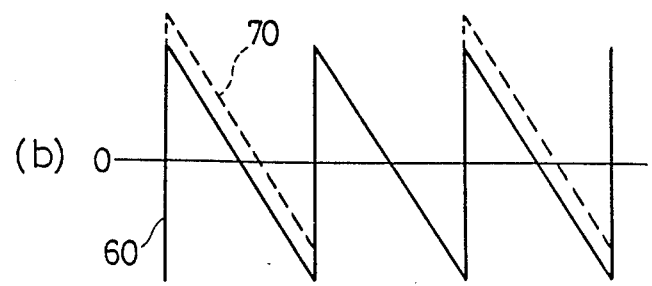

The real lines 60 in FIG. 4(b) illustrate a deflection yoke current and the dotted lines 70 illustrate a current obtained by multiplying the constant current 50 is applied by the current source as shown in FIG. 4(a). Thus, the both rasters of the even and the odd field may coincide.

In a case of color television receiver of 20 inches, the vertical deflection current is about 500 mA p-p, and the current value which is required for the constant current source 10 is below 1 mA DC, and this is exactly a possible value in a circuit construction.

Figure 5:
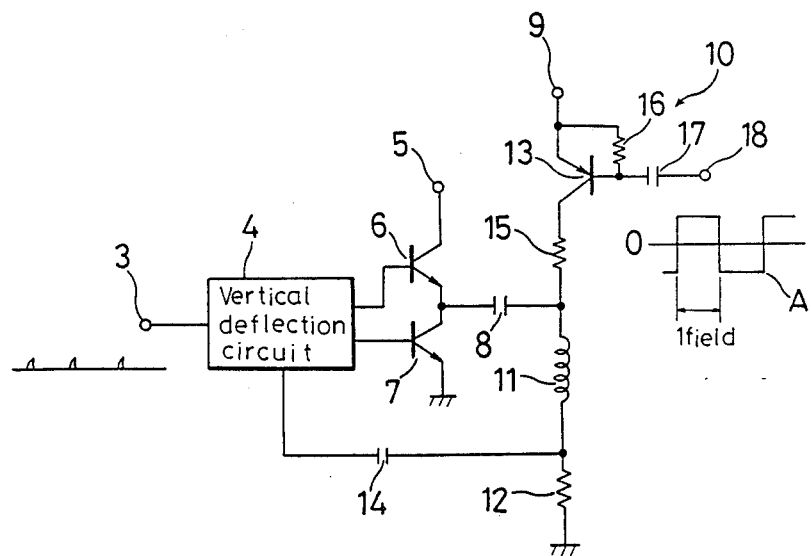
FIG. 5 is a diagram showing a concrete example of the current source 10 of FIG. 3.

FIG. 5 shows a concrete example of a current source 10 shown in FIG. 3. The reference numeral 13 designates a transistor which operates as a switch. The numeral 15 designates a current restricting resistance intended to control the current value for the raster shift flowing through the deflection coil 11. The numeral 16 designates a bias resistance, the numeral 17 designates a DC cut condenser, and the numeral 18 designates an input terminal for a control signal of the transistor 13.

When a signal A having repetition frequency of 25 Hz is applied to the input terminal 18 in the current source 10 shown in FIG. 5, the transistor 13 is turned only in alternate fields. As a result a required current for raster shift is supplied to the deflection coil 11 in the proper fields.

In this embodiment, a non-interlacing is conducted by a simple circuit, resulting in lowering the flitter of the characters by the interlacing at the reception of the character-broadcasting. It is possible to obtain a stable display of relatively small characters on the screen.

In the illustrated embodiment, a vertical deflection circuit of a CCIR B/G PAL system is described, but that of NTSC system can be realized in a similar manner.

As is evident from the foregoing, according to the present invention, a predetermined current is multiplied on the current flowing through the vertical deflection coil one after another field, and the luster raster of the even or the odd field are moved up or downwards to make the both rasters coincide with each other, resulting in a non-interlacing. The circuit operation is quite stable and a high precision is obtained. Furthermore, the device becomes inexpensive.

What is claimed is:

1. A vertical deflection circuit, which comprises:
   a vertical deflection coil;
   vertical deflection current means for supplying a vertical deflection current to the vertical deflection coil; and
   current source means for selectively imposing a predetermined current upon the vertical deflection current thereby increasing the current flowing through the vertical deflection coil in either an even field or an odd field of a television signal;
   wherein the raster of the even field and the raster of the odd field coincide with each other by the selective imposition of the predetermined current.

2. A vertical deflection circuit as defined in claim 1, wherein the predetermined current which is imposed on the vertical deflection current is a constant current.

3. A vertical deflection circuit as defined in claim 2, wherein the current source means comprises a transistor which, having its emitter connected to a voltage source, is turned on and off in alternate fields and a current restricting resistance connected between the collector of the transistor and the vertical deflection coil.

4. A vertical deflection circuit for conducting a non interlacing scan of a display, causing odd and even fields of the display to coincide, comprising:
   a vertical deflection coil;
   first means for supplying a vertical deflection current to said vertical deflection coil; and
   current source means for selectively applying a second current to said vertical deflection coil, said current source means applying said second current to said vertical deflection coil in either said even fields or said odd fields, said second current combining with said vertical deflection current so as to deviate a raster in the fields in which the second current is applied.

5. The vertical deflection circuit of claim 4 wherein said second current has a constant value when it is applied to said vertical deflection coil.

6. The vertical deflection circuit of claim 4 wherein said current source means comprises:
   a transistor, having an emitter connected to a voltage source, and
   a current-restricting a resistor connected between said vertical deflection coil and a collector of said transistor,
   wherein said transistor is selectively turned ON and OFF in alternate fields, thereby controlling the application of said second current to said vertical deflection coil.

7. The vertical deflection circuit of claim 4 wherein said first means for supplying a vertical deflection current to said vertical deflection coil comprises;
   a vertical deflection current source; and a push-pull circuit connected between said vertical deflection coil and said vertical deflection current source.

8. The vertical deflection circuit of claim 5 wherein said current source means comprises:
   a transistor, having an emitter connected to a voltage source, and
   a current-restricting resistor connected between said vertical deflection coil and a collector of said transistor,
   wherein said transistor is selectively turned ON and OFF in alternate fields thereby controlling the application of said second current to said vertical deflection coil.

9. The vertical deflection circuit of claim 8 wherein said first means for supplying a vertical deflection current to said vertical deflection coil comprises;
   a vertical deflection current source; and
   a push-pull circuit connected between said vertical deflection coil and said vertical deflection current source.

10. A vertical deflection circuit as defined in claim 1 to be used in a television receiver in which the number of scanning lines of each field is substantially equal to the number of scanning lines of each field of the broadcasting system which the television receiver receives.

* * * * *